United States Patent [19]
Kindt et al.

[11] Patent Number: 4,992,334
[45] Date of Patent: Feb. 12, 1991

[54] LOW TEMPERATURE WATERPROOFING LAMINATES

[75] Inventors: Lawrence J. Kindt, Woodbine; James M. Gaidis, Ellicott City, both of Md.; Jay S. Kellett, Reading, Mass.

[73] Assignee: W. R. Grace & Co.-Conn., New York, N.Y.

[21] Appl. No.: 295,331

[22] Filed: Jan. 10, 1989

[51] Int. Cl.$^5$ ............................................. B32B 11/00
[52] U.S. Cl. .................................................. 428/489
[58] Field of Search ...................... 428/489, 906, 280; 427/138; 524/64, 59; 366/194

[56] References Cited

U.S. PATENT DOCUMENTS

| | | | |
|---|---|---|---|
| 3,583,682 | 12/1971 | Bereata | 366/194 |
| 3,741,856 | 4/1973 | Hurst | 428/489 X |
| 3,900,102 | 9/1975 | Hurst | 428/906 X |
| 4,172,830 | 1/1979 | Rosenberg | 428/489 X |
| 4,328,147 | 4/1982 | Chang | 428/280 X |
| 4,442,148 | 4/1984 | Stierli | 428/489 X |
| 4,459,157 | 9/1984 | Koons | 524/59 |
| 4,547,399 | 2/1985 | Fujihara | 427/138 |
| 4,755,545 | 7/1988 | Lalwani | 524/64 |

FOREIGN PATENT DOCUMENTS

| | | | |
|---|---|---|---|
| 1230753 | 5/1971 | United Kingdom | 428/220 |
| 1400385 | 5/1972 | United Kingdom | 428/489 X |
| 2052378 | 1/1983 | United Kingdom | 428/489 X |

OTHER PUBLICATIONS

Brochure entitled "Bituthene ® Waterproofing".
Brochure entitled "Ice & Water Shield TM ".
Publication entitled "Roofing: Improved Bituminous Felts with Cariflex TR".
Publication entitled "Bitumen/Polymer Blends for Premium-Quality Roofing Products and Systems".
Technical Bulletin entitled "Kraton ® Thermoplastic Rubber in Asphalt Products".
Publication entitled "The Role of Bitumen in Blends with Thermoplastic Rubbers for Roofing Applications".
Publication entitled "Finaprene Rubbers for Bitumen Modification".
Publication entitled "Rubber Dispersion in Bitumen by Fluorescent Microscopy".

Primary Examiner—Thomas J. Herbert
Attorney, Agent, or Firm—Chester Cekala; William L. Baker

[57] ABSTRACT

Disclosed are methods for waterproofing civil engineering structures using flexible, sheet-like waterproofing laminates which are applied to structures at temperatures as low as 0° F. Also, disclosed are low-temperature-applicable waterproofing laminates having a bituminous layer comprising 29 to 54 weight percent asphalt, 25 to 50 weight percent process oil, and 16 to 35 weight percent thermoplastic block polymer of styrene and butadiene monomers.

5 Claims, No Drawings

LOW TEMPERATURE WATERPROOFING LAMINATES

BACKGROUND OF THE INVENTION

1. Field of the Invention

This invention relates to methods for waterproofing or dampproofing various water-penetrable construction materials in which improved, pre-formed, flexible sheet-like waterproofing laminates are applied to structures at temperatures below about 40° F. Included in this invention are improved, pre-formed, flexible sheet-like waterproofing laminates which are applicable to various buildings and other civil engineering structures at temperatures below 40° F.

2. Description of Related Art

Various materials used in building construction and other civil engineering projects such as roads, bridges, buildings, foundations, and plaza decks are susceptible to water penetration resulting, in part, from their inherent properties. Reducing or eliminating water penetration through structures formed of these materials often is desirable and may be critical in certain structures such as those housing sensitive electronic equipment or tunnels moving vehicular or pedestrian traffic under bodies of water. For many year, flexible, sheet-like waterproofing laminates of support films and bituminous layers pre-formed in a factory have been employed as waterproofing agents.

Although pre-formed, flexible sheet-like waterproofing laminates of support films and bituminous layers have been used for many years, use of these laminates continues to be limited by the widely recognized but unmet need for laminates which can be applied confidently at cold temperatures. Thus, when ambient temperatures fall below about 40° F, particularly below 25° F, application of waterproofing laminates generally is abandoned and replaced by hot applied waterproofing agents. Weak lap adhesion, i.e., laminate to laminate adhesion at joints between laminate sections, is the primary factor restricting low temperature application. Even specialized laminates recommended for application at temperatures below 40° F are not applied at temperatures below 25° F because of weak lap adhesion.

Flexible, pre-formed laminates of the type mentioned above and their use to form waterproofing layers in various kinds of building structures are described in, for example, U.S. Pat. Nos. 3,741,856; 3,583,682; and 3,900,102 to Hurst. U.S. Pat. No. 4,172,830 to Rosenberg et al. is another of many examples disclosing sheet-like flexible materials used for waterproofing.

Currently there are available waterproofing laminates recommended for application down to 25° F These products include a polyethylene layer and a bituminous layer including asphalt, process oil, rubber, and filler.

U.S. Pat. No. 4,755,545 to Lalwani describes a self-sealing roofing adhesive blend including 50-95% by weight of a bituminous component, 4-40% by weight of an inert filler, and 1-6% by weight of a thermoplastic block polymer of styrene and butadiene monomers.

U.S. Pat. No. 4,547,399 to Fujihara et al. discloses a composition effective for sealing cracks and joints in asphalt and concrete streets and highways that includes paving grade asphalt, process oil (not over 32%), and styrene-butadiene rubber or rubbers.

U.S. Pat. Nos. 4,328,147 and 4,382,989 to Chang et al. describe asphaltic compositions useful as roofing asphalts which include 39-99% by weight of oxidized asphalt and from 1-8% oxidized polyethylene.

U.S. Pat. No. 4,459,157 to Koons describes a composition of an asphalt blend in which a butadiene-styrene elastomeric block copolymer is dispersed and contains 5-45% by weight of catalytic petroleum cracker bottoms oil. This composition is characterized further by a low asphaltene content.

SUMMARY OF THE INVENTION

The present invention relates to methods for waterproofing certain water-penetrable construction materials comprising application at temperatures as low as about 0° F of improved pre-formed, flexible, sheet-like, waterproofing laminates to structures. The improved pre-formed, flexible, low temperature applicable laminates used in the invented methods are comprised of support films and bituminous layers in which the bituminous component includes 29-54 weight percent asphalt, 25-50% weight percent process oil, and 16-35 weight percent of a thermoplastic block polymer of styrene and butadiene monomers.

DETAILED DESCRIPTION OF THE INVENTION

Waterproofing of structures such as buildings, bridges, roads, tunnels, foundations, and plaza decks using pre-formed, flexible, sheet-like laminates of film and bituminous layers requires application of numerous sections of waterproofing laminate. To provide a continuous moisture barrier, the sections are overlapped and adhered together. Optimum waterproofing thus requires bonds between sections of waterproofing laminate which endure essentially for the life of the structure. The present invention resides in the discovery of improved waterproofing laminates having a bituminous layer comprised of about 29 to 54% by weight asphalt, about 25 to 50% by weight process oil, and about 16 to 35% by weight of a thermoplastic block polymer of styrene and butadiene monomers. As used herein, the weight percent of asphalt, process oil, and thermoplastic block polymer of butadiene and styrene is calculated based on the total of these components not including fillers or any other components. Further, at temperatures as low as about 0° F these laminates form sufficiently strong and enduring laminate-to-laminate bonds to enable application of the improved waterproofing laminates at these low temperatures. Thus, the invented low temperature-applicable waterproofing laminates are waterproofing laminates which form sufficiently strong and enduring laminate-to-laminate bonds to make possible application of waterproofing laminates at temperatures as low as about 0° F, especially between 0° F and 25° F, most especially between 10° F and 20° F, which meet relevant construction industry specifications and standards. Moreover, the invented low temperature-applicable waterproofing laminates retain sufficient high temperature flow resistance to enable application on structures where temperatures may exceed 140° F such as plaza decks of buildings in hot climates.

As used herein, waterproofing laminates are flexible, sheet-like materials comprising a bituminous layer such as asphalt, rubberized asphalt, or equivalent materials, and a support material, preferably a film of a synthetic polymer such as polyethylene, polypropylene or other polyolefin; polyamide; polyester, e.g., polyethylene terephthalate, polyurethane, polyvinyl chloride; a copolymer of vinyl chloride and vinylidene chloride; synthetic rubber such as polychloroprene or butyl rubber; or other similar materials. Preferably, the bituminous layer is at least 25 mils thick, more preferably from 50-60 mil thick. Thus, waterproofing laminates to not include materials such as roofing felts wherein a bituminous material is impregnated into a support mat made of, for example, fiberglass, cellulosic materials, organic polymers, felt, or other materials to which asphalt will adhere. The presently invented waterproofing laminates, at temperatures as low as about 0° F, preferably are applied to structures to which previously have been applied suitable primers. Suitable primers include known waterproofing laminate primers such as compositions of asphalt cutbacks, natural or synthetic rubbers and diluent or filler resins in organic solvents. Generally primers are not applied on a laminate surface which is adhered to another laminate surface at joints between adjacent laminate sections.

The asphalt used in the invented, improved waterproofing laminates has the following alumina separation (ASTM D4124) range and preferred ranges:

|  | Range | Preferred Range |
|---|---|---|
| Saturates | 5-25% | 8-15% |
| Naphthenic Aromatics | 20-40% | 32-40% |
| Polar Aromatics | 30-50% | 40-46% |
| Asphaltenes | 5-20% | 8-15% |

The process oil used in the bituminous layer of the presently invented waterproofing laminates is operative process oil defined as a generally naphthenic, aliphatic, or naphthenic-aliphatic oil which has the following clay gel separation (ASTM D2007) range:

| Saturates | 10-30% |
|---|---|
| Polar Compounds | 10-20% |
| Aromatics | 50-85% |
| Asphaltenes | 0-0.5% |

The thermoplastic block polymer of styrene and butadiene monomers is selected using known procedures so that the resulting bituminous layer has sufficient strength and tackiness to produce low temperature applicable waterproofing laminates. Preferred thermoplastic block polymers of styrene and butadiene monomers are mixtures of polymers having a butadiene:styrene ratio of about 70:30 and a block polystyrene content of about 30% (high molecular weight polymer) and polymers having a butadiene:styrene ratio of about 75:25 and a block polystyrene content of about 18% (low molecular weight polymer). More preferred are polymers in which the ratio of the low molecular weight polymer to the high molecular weight polymer is in the range of 5:1 to 1:1. Most preferred are polymers wherein the ratio of the low molecular weight polymer to the high molecular weight polymer is about 4:1 to 2:1.

Preferred waterproofing laminates of this invention include a bituminous layer comprising about 36 to 51 weight percent, more preferably about 39 to 43 weight percent asphalt; about 25 to 40 weight percent, more preferably about 30 to 40 weight percent process oil; and about 16-35 weight percent, more preferably about 16-25 weight percent thermoplastic block polymer of styrene and butadiene monomers.

Fillers are optional ingredients in the bituminous layer of the invented waterproofing laminates. Useful fillers include stone dust, lime stone, ground glass fibers, wollastonite, sand, talc, mica, vermiculite, carbon black, and titanium dioxide. Addition of fillers and various other optional ingredients, however, may reduce the ability of the invented waterproofing laminates to form sufficiently strong and durable lap bonds at joints between sections of laminate when applied at selected temperatures below 40° F. Thus, the types and amounts of fillers are selected so that the waterproofing laminate forms sufficiently strong and durable lap bonds when applied at temperatures as low as about 0° F as determined by the testing procedure described below.

A presently preferred composition for the bituminous layer of waterproofing laminates for low temperature application comprises about 41 weight percent asphalt having the above described alumina separation range, about 38 weight percent process oil having the above described clay gel separation range, about 21 weight percent thermoplastic block polymer of styrene and butadiene monomers, and up to 5 weight percent filler. More preferred is this composition wherein the thermoplastic block polymer is an about 2:1 ratio of the low molecular weight and high molecular weight polymers.

Various civil engineering structures including, for example, buildings, bridges, roads, tunnels, foundations, and plaza decks are made waterproof using the present invention. As used herein, making a structure "waterproof" means reducing or eliminating the ability of water to penetrate the structure. The presently invented waterproofing laminates are used to make waterproof structures constructed of materials which are water-penetrable either inherently or as a result if imperfections such as cracks or pores. The types of water-penetrable materials with which the present invention is used include, wood, brick, stone, exterior gypsum board, blended cements, pozzolanic cements, or concrete, preferably Portland cement concrete.

The presently invented waterproofing laminates are prepared according to the following general procedure. Previously powdered or ground thermoplastic polymer of styrene and butadiene monomers is added to process oil heated to approximately 350°-400° F and mixed until no polymer particles are apparent. Thereafter, asphalt is added to the polymer-oil blend with mixing until a uniform composition has formed. This polymer-oil-asphalt composition then is poured onto release paper and covered with a support film. Alternatively, the polymer-oil-asphalt composition is prepared by adding thermoplastic polymer to a mixture of process oil and asphalt heated to about 350° to 400° F.

According to the presently invented methods for waterproofing structures wherein the invented waterproofing laminates are applied at temperatures as low as about 0° F, preferably between 0° F and 25° F, more preferably between 10° F and 20° F, the waterproofing laminate is applied to the structure with pressure and pressure is applied to form lap bonds. Preferably, pressure greater than hand pressure, for example, using a roller, is used. In preferred methods the invented waterproofing laminates are applied to vertical aspects of structures. In other preferred methods the waterproofing laminates are applied to horizontal aspects of structures. Generally, at joints between laminate sections the bituminous layer of one section is affixed to the support film of an adjacent section. Optionally, at joints the support film is removed from the underlying laminate section so that the bituminous layer of the overlying laminate section is adhered directly to the bituminous layer of the underlying laminate section. At joints an overlap width of about two inches is preferred. Primers such as mentioned above can be used to form lap bonds, but primerless formation of lap bonds is preferred.

As used in the invented methods, application of waterproofing laminates at temperatures as low as about 0° F, preferably between about 0° F and 25° F, more preferably between about 10° F and 20° F, results in laminate-to-laminate bonds that are sufficiently strong and enduring to prevent entry of water along the waterproofing laminate section lap edges essentially for the life of the structure.

The Example 5 test procedure was selected to predict actual use requirements and used to identify waterproofing laminates which when applied at temperatures between about 0° F and 25° F form laminate-to-laminate bonds of sufficient strength and duration to meet relevant construction industry specifications and standards. When measured at about 5 minutes following application at 20° F, a peel force of 2.0 pounds per linear inch approximates the minimum needed for waterproofing laminate-to-laminate bonds of sufficient strength and duration for the tested waterproofing laminate to meet relevant construction industry specifications and standards when applied at temperatures between about 0° F and 25° F. Waterproofing laminates which meet or exceed the Example 5 criterion are referred to herein as low temperature-applicable waterproofing laminates.

Contemplated equivalents of the present invention include waterproofing laminates having similar asphalt-polymer compositions which at temperatures as low as about 0° F can be applied and produce sufficiently strong and enduring waterproofing laminate-to-laminate bonds to meet construction industry waterproofing specifications and standards. Other contemplated equivalents are low temperature-applicable waterproofing laminates having a bituminous layer and a support material wherein some part of the bituminous layer is impregnated into the support material.

The following examples provide specific illustrations of the invention, but are not intended to limit the scope of the invention as described above and claimed below.

EXAMPLE 1

Process oil (228 g) having clay gel separation (ASTM D2007) range as stated above was heated to 350° F to 400° F using a heating mantle. Then 42 g of powdered (passes 10 mesh sieve) styrene-butadiene rubber having a 70:30 butadiene-styrene ratio and a block polystyrene content of 30% was added slowly to avoid lumping and mixed with a paddle mixer. Next, 84 g of ground (passes 4 mesh sieve) styrene-butadiene rubber having a 75:25 butadiene:styrene ratio and a block polystyrene content of 18% slowly was added and mixed for 30 to 60 minutes. This oil and rubber mixture then was mixed until no rubber particles were apparent, usually from 30 minutes to 3 hours. Then 240 g asphalt at 300° F to 350° F was added and mixed for 30 to 60 minutes. This rubberized asphalt then was poured onto release paper at a thickness of approximately 56 mils and covered with polyethylene film.

EXAMPLE 2

Process oil (180 g) having clay gel separation (ASTM D-2007) range as stated above and asphalt (294 g) having the alumina separation (ASTM D4124) range stated above was heated to 350° F to 400° F using a heating mantle. Then 42 g of powdered (passes 10 mesh sieve) styrene-butadiene rubber having a 70:30 butadiene-styrene ratio and a block polystyrene content of 30% was added slowly to avoid lumping and mixed with a paddle mixer. Next 84 g of ground (passes 4 mesh sieve) styrene-butadiene rubber having a 75:25 butadiene-styrene ratio and a block polystyrene content of 18% slowly was added and mixed for 30 to 60 minutes. This rubberized asphalt then was poured onto release paper at a thickness of approximately 56 mils and covered with polyethylene film.

EXAMPLE 3

Process oil (456 g) having the above clay gel separation (ASTM D2007) range, 84 g of styrene-butadiene rubber having a 70:30 butadiene-styrene ratio and a block polystyrene content of 30%, and 168 g of a styrene-butadiene rubber having a 75:25 butadiene-styrene ratio and a block polystyrene content of 18% was mixed at about 300° to 350° F for about one hour. Thereafter asphalt (492 g) having the above alumina separation (ASTM D4124) range was added and mixed for thirty minutes. Mixing is performed under argon gas to reduce oxidation. Then, the rubberized asphalt thus prepred is poured onto release paper at a thickness of approximately 56 mils and covered with polyethylene film.

EXAMPLE 4

Using the process of Example 3, a waterproofing laminate having a bituminous layer consisting of Process Oil (360 g) having the above described clay gel separation (ASTM D2007) range, high molecular weight polymer (84 g), low molecular weight polymer (168 g), and asphalt (588 g) having the above described alumina separation (ASTM D4124) range was prepared.

EXAMPLE 5

Lap Adhesion Testing

The following procedure is used to measure bond strength of joints between two sections of waterproofing laminates. Waterproofing laminates with release paper attached was cut in sections of about 2" by 7". Using a scalpel 1" of the release paper is removed from one of the 2" edges of each section of waterproofing laminate. The area where the release paper was removed then is covered with masking tape to form a tab. Polyethylene film sections of 3" wide by 7" long also are prepared.

For two hours prior to testing, the waterproofing laminate sections and polyethylene film sections are maintained at the temperature selected for lap adhesion testing. The release paper then is removed from the laminate samples and a laminate sample is affixed to a section of polyethylene film, and rolled three times with a 2⅜" wide, twenty-pound steel roller. After five minutes, the laminate-film samples are placed in the mechanical jaws of a physical tester (Sintech ®), and the physical tester crosshead is moved at 2" min. The force required to peel (180°) apart the laminate and film sections then is computed and displayed as Peel Force in pounds per inch width of laminate.

Testing using this procedure yielded the data in Table I, below. In the Table, Controls 1 and 2 are commercially available waterproofing laminates having a bituminous layer containing process oil, asphalt, rubber, and filler. Control 2 also is a commercially available product recommended for application down to 25° F.

TABLE I

| Sample | Peel Force (lbs/in) | | | |
|---|---|---|---|---|
| | 0° F | 20° F | 40° F | 73° F |
| Example 1 | 2.2 | 6.1 | 4.2 | 1.4 |
| Example 2 | <1.0 | 5.4 | 5.9 | 3.1 |
| Control 1 | 0.0 | <1.0 | 1.2 | 1.6 |
| Control 2 | 0.0 | <1.0 | 2.1 | 2.6 |

EXAMPLE 6

High Temperature Flow Resistance

The following procedure was used to test high temperature flow resistance of the invented low temperature-applicable waterproofing laminates. Initially, 2" wide × 3" long × 56 mil thick samples of the bituminous layer (without support film) of the waterproofing laminates was affixed to 20 gauge steel sheet. Then the steel sheet with bituminous layer affixed is conditioned horizontally at test temperature for one hour. Thereafter, the steel sheet is maintained vertically at testing temperatures for the testing duration. After the testing duration, the maximum sag or drippage point at the bottom of each sample is measured.

TABLE II

| | Temperature/Time (cm) | | |
|---|---|---|---|
| | 24 Hours | | 48 Hours |
| Sample | 160° F | 180° F | 160° F |
| Example 1 | 1.1 | 6.9 | 1.1 |
| Example 2 | 0.0 | 0.7 | 0.0 |
| Control 1* | 3.6 | 15+ | 6.8 |
| Control 2* | 2.7 | 15+ | 5.5 |

*Controls 1 and 2 are the same as Example 5

EXAMPLE 7

Slow Peel Testing

A section of galvanized steel is sprayed with a spray adhesive, and a piece of cross-laminated polyethylene film is placed on the adhesive. The steel with film attached then is allowed to dry overnight. A 56 mil thick section of a waterproofing laminate bituminous layer is applied to a backing material and cut in about 3"×7" strips. A 1 inch wide piece of tape is affixed to one of the 3" wide edges. This bituminous layer test sample then is applied to the polyethylene film attached to the steel and rolled three times with a 28-pound steel roller. The steel with bituminous layer attached then is maintained horizontally for one hour. Thereafter, the sample is placed vertically with the taped tab at the top, a 100 g weight is attached to the tab, and the sample is maintained at 120° F for the testing period. Testing of the bituminous layers of Examples 3 and 4 yielded the data in Table III:

TABLE III

| Sample | Peel Distance (cm) at 1 hr. |
|---|---|
| Example 3 | 1.6 |

TABLE III-continued

| Sample | Peel Distance (cm) at 1 hr. |
|---|---|
| Example 4 | 2.7 |

The preferred embodiments of the invention are illustrated by the above. However, the invention is not limited to the instructions disclosed herein, and the right to all modifications within the scope of the following claims is reserved.

We claim:

1. A low temperature applicable waterproofing laminate which when applied at temperatures between 0° F and 25° F meets construction industry standards and which includes a bituminous layer and a support material wherein the bituminous layer comprises 29 to 54 weight percent asphalt having the following alumina separation (ASTM D4124) range:

| Saturates | 5–25% |
|---|---|
| Naphthenic Aromatics | 20–40% |
| Polar Aromatics | 30–50% |
| Asphaltenes | 5–20%; |

25 to 30 weight percent oil having the following clay gel separation (ASTM D2007) range:

| Saturates | 10–30% |
|---|---|
| Polar Compounds | 10–20% |
| Aromatics | 50–85% |
| Asphaltenes | 0–0.05; and |

16 to 35 weight percent thermoplastic polymer of styrene and butadiene monomers comprising a mixture of a polymer having a polystyrene:butadiene ratio of about 70:30 and block polystyrene content of about 30% (high molecular weight polymer) and a polymer having a polystyrene:butadiene ratio of about 75:25 and a block polystyrene content of about 18% (low molecular weight polymer) wherein the ratio of low molecular weight polymer to high molecular weight polymer is in the range of 5:1 to 1:1.

2. A low temperature-applicable waterproofing laminate of claim 1 in which the asphalt has the following alumina separation range:

| Saturates | 8–15% |
|---|---|
| Naphthenic Aromatics | 32–40% |
| Polar Aromatics | 40–46% |
| Asphaltenes | 8–15%. |

3. A low temperature-applicable waterproofing laminate of claim 1 having 36 to 51 weight percent asphalt, 25 to 35 weight percent process oil, and 16 to 35 weight percent thermoplastic polymer of styrene and butadiene monomers.

4. A low temperature-applicable waterproofing laminate of claim 1 wherein the ratio of low molecular weight polymer to high molecular weight polymer is 4:1 to 2:1.

5. A low temperature-applicable waterproofing laminate of claim 4 having 41 weight percent asphalt, 38 weight percent process oil, and 21 weight percent thermoplastic polymer of styrene and butadiene monomers.

* * * * *

UNITED STATES PATENT AND TRADEMARK OFFICE
CERTIFICATE OF CORRECTION

PATENT NO. : 4,992,334
DATED : February 12, 1991
INVENTOR(S) : Lawrence J. Kindt; James M. Gaidis; Jay S. Kellett It is certified that error appears in the above—identified patent and that said Letters Patent is hereby corrected as shown below:

Column 8, line 26:

Claim 1, line 12, delete "25 to 30 weight percent oil" and substitute therefore --25 to 50 weight percent oil--.

Signed and Sealed this

Twenty-eighth Day of July, 1992

Attest:

DOUGLAS B. COMER

Attesting Officer    Acting Commissioner of Patents and Trademarks